United States Patent
Volcic et al.

(10) Patent No.: US 7,627,394 B2
(45) Date of Patent: Dec. 1, 2009

(54) ROBOT TRAJECTORY CONTROL INCLUDING EMERGENCY EVACUATION PATH SYSTEM AND METHOD

(75) Inventors: Edward Volcic, Rochester Hills, MI (US); Khalid Mirza, Troy, MI (US)

(73) Assignee: KUKA Roboter GmbH, Augsburg (DE)

( * ) Notice: Subject to any disclaimer, the term of this patent is extended or adjusted under 35 U.S.C. 154(b) by 629 days.

(21) Appl. No.: 11/313,207

(22) Filed: Dec. 20, 2005

(65) Prior Publication Data

US 2007/0142967 A1 Jun. 21, 2007

(51) Int. Cl.
*G06F 19/00* (2006.01)
(52) U.S. Cl. ............. 700/245; 700/251; 700/253; 700/255; 700/258; 700/213; 318/567; 318/568.12; 318/568.13; 318/568.16; 318/568.19
(58) Field of Classification Search ............. 700/245, 700/213, 177
See application file for complete search history.

(56) References Cited

U.S. PATENT DOCUMENTS

| | | | | |
|---|---|---|---|---|
| 4,890,241 A | * | 12/1989 | Hoffman et al. | 700/255 |
| 5,280,431 A | * | 1/1994 | Summerville et al. | 701/24 |
| 5,758,298 A | * | 5/1998 | Guldner | 701/23 |
| 5,808,887 A | * | 9/1998 | Dorst et al. | 345/474 |
| 5,920,678 A | * | 7/1999 | Watanabe et al. | 700/255 |
| 6,463,358 B1 | * | 10/2002 | Watanabe et al. | 700/253 |
| 6,539,284 B2 | * | 3/2003 | Nourbakhsh et al. | 700/245 |
| 6,646,404 B2 | * | 11/2003 | Okuyama et al. | 318/568.13 |
| 6,760,647 B2 | * | 7/2004 | Nourbakhsh et al. | 700/245 |
| 6,822,412 B1 | * | 11/2004 | Gan et al. | 318/568.19 |
| 6,941,191 B2 | * | 9/2005 | Jaeger | 700/245 |
| 7,209,801 B2 | * | 4/2007 | Anfindsen et al. | 700/245 |
| 2004/0068348 A1 | * | 4/2004 | Jager | 700/255 |
| 2005/0264251 A1 | * | 12/2005 | Bischoff et al. | 318/563 |
| 2007/0005179 A1 | * | 1/2007 | Mccrackin et al. | 700/213 |

FOREIGN PATENT DOCUMENTS

GB 2 027 938 A 2/1980

* cited by examiner

*Primary Examiner*—Khoi Tran
*Assistant Examiner*—Jonathan Sample
(74) *Attorney, Agent, or Firm*—McGlew and Tuttle, P.C.

(57) ABSTRACT

A system and process is provided for controlling a robot path of a robot including providing a main path for movement of the robot based on path data having points along the main path and providing a safe evacuation path from each point in the main path to get to a safe position. The main path is formed with safety evacuation path considerations in mind such that along any point on ride path the robot can be safely moved to a safety point or to the unload position or safe position.

15 Claims, 6 Drawing Sheets

ROBOT TRAJECTORY CONTROL INCLUDING EMERGENCY EVACUATION PATH SYSTEM AND METHOD

The invention relates generally to multi-axis robot systems such as robots according to EN ISO 8373, subsection 2.6 and more particularly to robot path control providing procedures for emergency stopping including safe evacuation paths for emergency stopping positions.

BACKGROUND OF THE INVENTION

Robot control systems typically provide for an emergency stop (E-Stop), to halt the multi-axial robot in an emergency situation. Usually, pressing of E-Stop results in the robot following a category 0 or 1 stop. Even after stopping the robot along the normal trajectory of the robot, there are situations that require the robot to be moved off the normal trajectory path to a safe position within the workspace of the robot.

The problem is that the user requires the ability to move the robot from any position on the path to a safe position off of the path without coming into contact with the environment, or adjacent robots. The robot needs to move in a controlled manner to a safe position. In such situations, operators with little or no robot experience need to be able to move the robot off of its path for evacuation of guests or for other further steps. It can be difficult for someone to use a control to move the robot manually without colliding with the environment. This may be due to the size of the robot and its proximity to the environment.

SUMMARY OF THE INVENTION

It is an object of the invention to provide a robot system and method in which a safe evacuation is defined based on the stopping position of the robot.

It is another object of the invention to provide a robot system and method in which a safe evacuation path from each point on the robot's normal trajectory is defined allowing the robot to be used over a normal trajectory and if the situation arises that requires the robot to be moved off the path to a safe position within its workspace, this may be done automatically.

The above objects are achieved by a process for controlling a robot path of a robot, the process comprising: providing a main path for movement of the robot and providing a safe evacuation path from each point in the main path to get to a safe position.

Furthermore, the objects are achieved by a multi-axial robot path control system, comprising: system memory means for storing data; a multi-axial robot; it may or may not include external axes; a control unit for moving a tool center point along a travel path defined by location points saved in said memory means; and plural safety paths saved in said memory means, with each of the location points of the travel path associated with one of the safety paths, wherein upon a need to remove the robot from the travel path, the control unit moves the robot along one of the safety paths based on a current location point of the robot along the travel path.

The invention is based on the concept of providing a safe evacuation path from each point in the path (also referred to as main path or travel path) to get to a safe position. The programmer may teach points to form the main path with safety evacuation path considerations in mind. The main path should be such that any point on path can be safely moved to a safety point. Advantageously, the safety path includes at least a segment from one point along the travel path or segments from plural points along the travel path to a safety level 1 point along the safety path. The safety path then proceeds to the safety level 2 point and on to the safe point.

Programmer/operators will create the safety paths at various points along the ride path. The operators or active robot operators may execute a safety path in an emergency situation. Further, maintenance personnel may execute a safety path to bring the robot offline in the event of a maintenance problem.

Each position on the path may have a plurality of safe position(s) associated with that it can move to. This can be done with a unique safety path for each point of the robot main path. Ideally, a unique safety path would exist for each unique position in the ride path. However, to save on the total data (to address memory constraints) this may not be practical to save and make available for execution the safety path for each point on the main path. As such groups of points on the robot main path are associated with a safety path, namely when the safety path is executed, the first point on the safety path is in common to several points on the robot main path. Further, two or more safety paths may share points, with all safety paths advantageously sharing the final safety point or unload point. The user may create unique safety paths throughout the entire path. The unique safety paths would allow the user to create specialized paths that take into account obstacles, adjacent robots and orientation of the robot itself. Safety paths for groups of positions in the path table is an approach which reduces the number of safety paths the programmer would be required to teach the robot. One version of this is to provide special markers that can be added into the path table that indicates which safety path should be active for the following set of points on the main path or ride path. Then during the execution of the main path the underlying control system (Path Table manager for example) will keep track of the safety path that is active based on the position of the robot. When the user triggers the execution of the current safety path, the robot will move to the position as defined by the currently active safety marker.

The robot may move with a slow speed while executing the safety path (each safety path motion may be executed with the robot moving at a very slow speed).

The programmer shall have the ability to teach each safety path positions so that the robot can avoid all obstacles. The safety paths need to be manually taught after generation of the ride path. If the safety path cannot be executed during normal path operation the operator/maintenance must change to a manual mode to execute the safe path. However, some safety path should be available for each position point along the main path.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
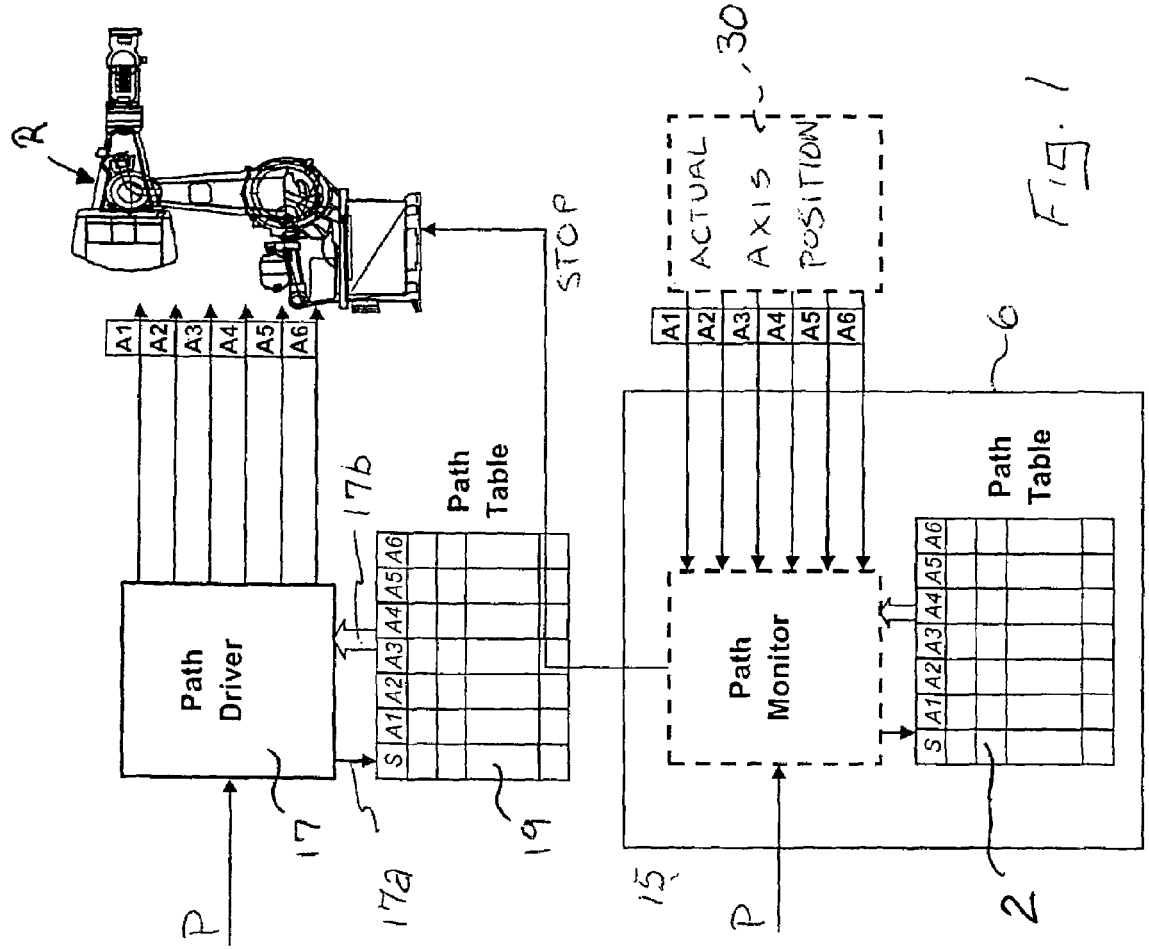
FIG. 1 is a schematic block diagram showing control process and system features for controlling the robot path using a path table.

Referring to the drawings in particular, the system and method are based on a robot (multiaxial robot with turntable) R as shown in FIG. 1 using a path table 2 which is generated off-line by one or more programmers taking into account turntable information (i.e., the information on the position of the turntable) as the motion about a principal axis, about which the robot moves. This motion may be eccentric (as in the case of a carousel), while the motions of the robot axes, six axes in a conventional robot, depend on the principal motion of the turntable with this relationship being defined in the path table 2 to define a main path (also referred to as travel path and main ride path). Instead of a turntable axis as the principal axis, a linear axis may be provided as well. Moreover, the basic motion may also be a more complex motion than a rotary motion about a principle axis or than a linear motion along a principal axis; what is essential is a preset path of motion with positions of the principal motion, to which positions of the rotor axes A1, A2, A3, A4, A5, A6 can be assigned to form the path table 2.

When the motion profile is generated, the path of motion of the robot arm, more specifically the TCP (Tool Center Point) of the robot, is determined at first at the hand of the robot, and the motion process is determined next along this path, taking into account velocities and accelerations, and the path table 2 is finally generated. A row of the table is assigned to each position of the principle axes in the path table 2. To control a robot R, the path table 2 is fed into the robot control 6, for example, from an external memory 5 (FIG. 2), and the robot control 6 polls the turntable position 7 during cycles and sends control commands to the robot R based on this for actuating the actuators of the robot and consequently for positioning the robot axes and the components of the robot via an output 8. The robot control 6 may have a control output 9 to the robot R as well as additional inputs and outputs 10 for receiving external sensor signals, such as signals from sensors and encoders. The robot control 6 may also have a path table interpreter 11 (used after loading the path table 2 from the mass storage unit 5 in a volatile memory 12) and a path table manager 13.

As shown in FIG. 1 the controller 6 controls the robot for moving along the main path 32. The path table 2 (robot positions assigned in the table to defined positions of the principal axes) is analyzed by means of the path table interpreter 11, checked for syntactic correctness, converted into a machine-readable form, and stored in the volatile memory 12. A. The path table manager 13 of the robot control 6 is responsible for the initialization and coordination of the execution of the path table 2 and polls, as was stated before, the position (here of the turntable), which is determined by the principal or basic motion, reads the corresponding position of the robot or more accurate positions of the robot axes from the path table 2 and actuates these via the output 9 and gives the actuators (motors) of the robot the command to bring the corresponding robot axes A1 through A6 into the position determined by the path table 2. The positions of the robot axes are monitored by a monitoring module 14 and are compared as actual positions of the axes with the desired positions of the axes preset by the path table 2 by means of a path monitor 15, after which a correction of the axis positions is optionally performed via a path driver 17. The path driver receives for this the position P of the principal axis transmitted to it and passes with this information over into the table on 17a. However, it receives the robot position 17b as a result. With the system and process the robot interpreter/controller executes a robot program where this robot program contains a special instruction, which transfers the control to the path table 2, e.g., with the indication of the path table 2 to be run. The path table manager 13 loads the corresponding table and begins processing the table. Corresponding to the position of the principal axis, the controller receives the corresponding robot position from the table and sends a displacement command to the motion controller 9. The position of the principal axis can be transferred, e.g., via Input Outputs 10. In addition or as an alternative, the axis position can also be used to monitor the security of the motion path of the robot R, as this is shown in FIG. 1. The monitoring being performed, for example, in a memory-programmable control (PCSPS-PLC) 6 with a path monitor 15, the second copy of the path table 2 being stored in this control 6, and the actual axis position 30 being compared via a security path monitor 19 with the actual position preset by the path table 2 and, if necessary, the motion can be stopped, it is possible to move into a safe position, or the like.

Figure 3A:
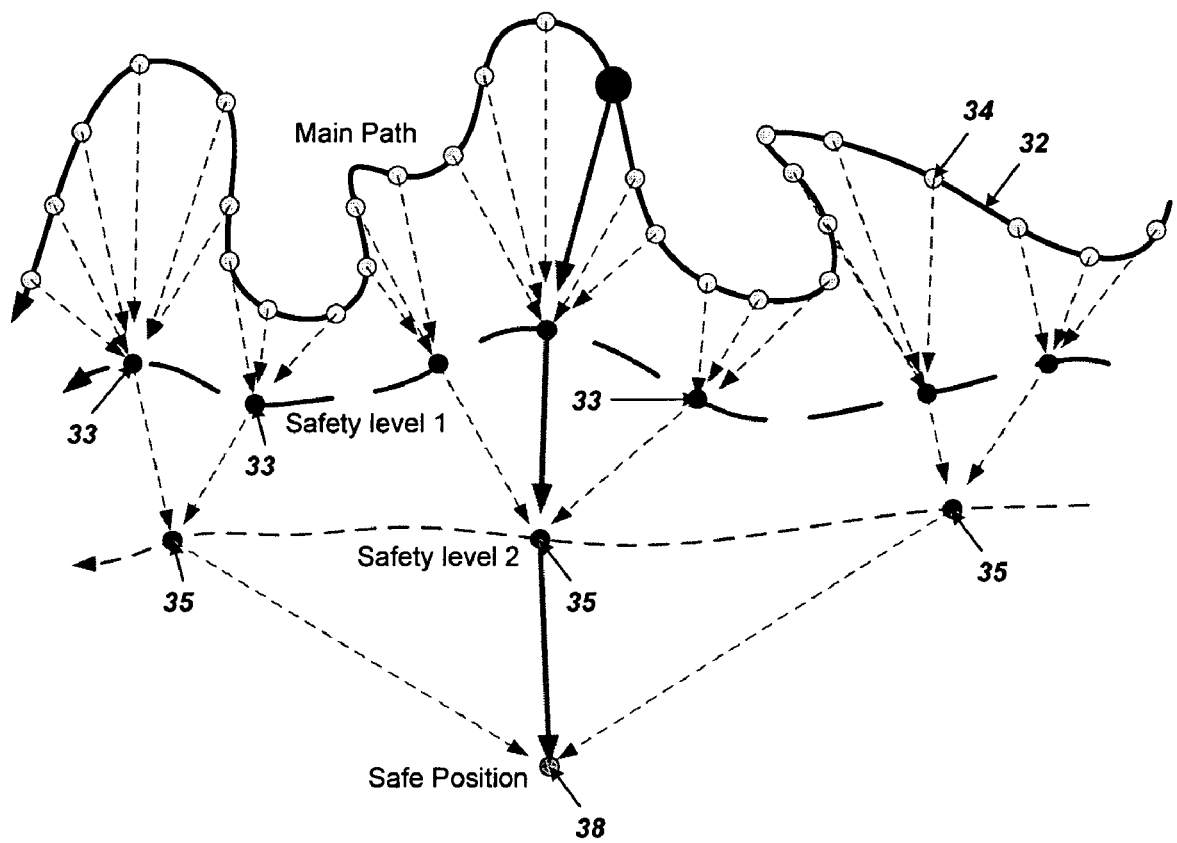
FIG. 3A is a two-dimensional view depicting a three dimensional robot path (ride path) as well as safety paths with various safety levels and a safe point.

FIG. 3A depicts a ride path or main path 32 that the robot R travels. The various points 34 along the path 32 correspond to a position of the TCP (or the main point of interest—such as passenger reference location or work point reference location) with the positions of the axes being synchronized with the primary movement aspect as noted above. With this each position 34 is defined with axes positions related to turntable position in the path table 2. According to the invention, the controller 6 can be made to execute a safety path where the controller 6 determines a particular safety path 36 based on a current position 34 along the path 32. Although the system and process may be provided such that each individual position point 34 has its own safety path 36, this is a memory intensive approach. Accordingly, various additional positions or safety levels are a defined with each position spaced from the path 32. Groups of points 34 are associated with a common safety level point. For example, several positions 33 are defined to provide a first safety level 1. Several different positions 34 along the path 32 share a first safety level point 33 and share a common safety path 36. An additional safety level 2 is also defined by points 35. Further safety levels may be defined and advantageously a safe unload point 38 is also defined. The safety paths 36 each include a unique safety level 1 point 33, and may share a safety level 2 point 35 and in the embodiment all safety paths 36 share a safe unload point 38. With this it at least once safety path 36 is provided for each of the positions 34 along the main path 32. The multi-safety level feature may be used for sample to provide different levels of evacuation. The safety level feature may be for example set where safety level 1 positions the robot outside of a range of movement of some features such as a range of movement of a workpiece or other robots. The safety level 2 may be for example set to be positions of the robot outside of the normal or possible region for human workers or technicians. The safe unload point is preferably set as a position the robot R is inactivated or in a position out of areas of safety concerns.

Figure 3B:
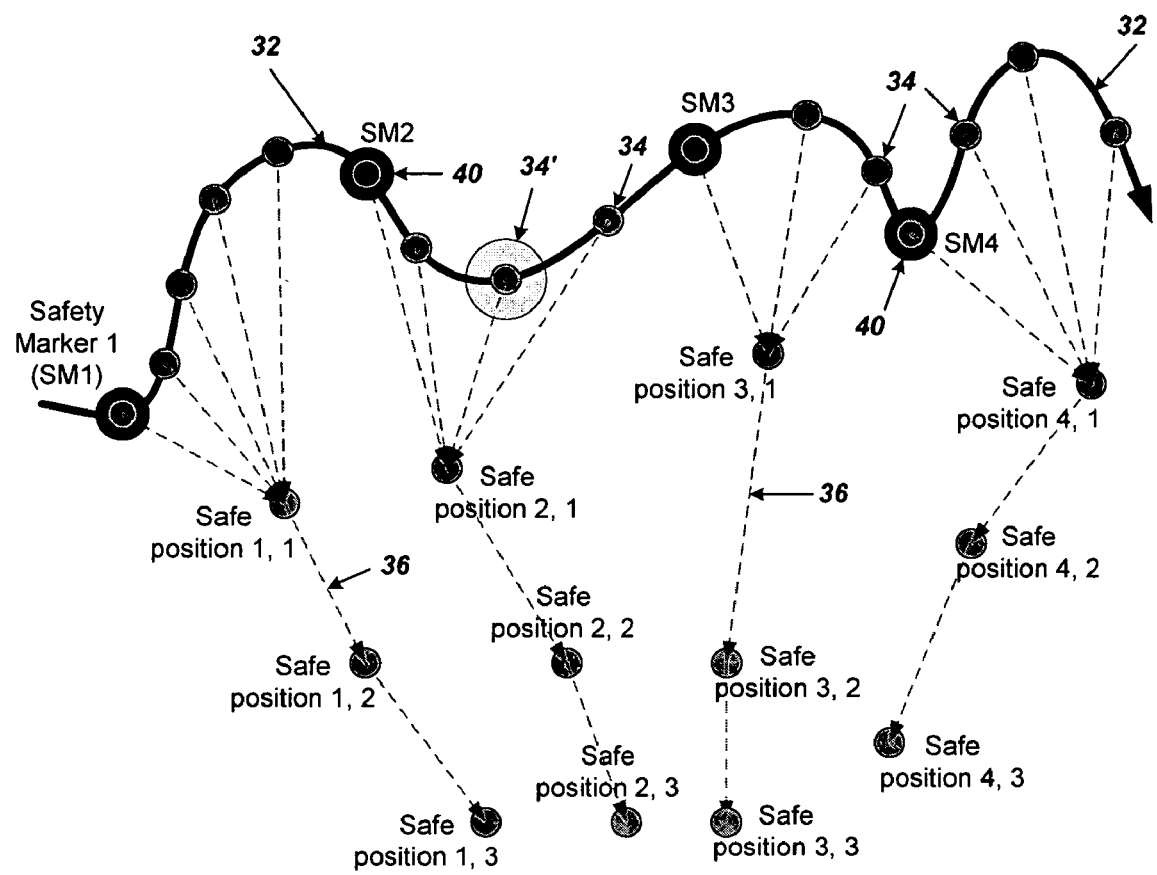
FIG. 3B is a two dimensional view depicting a three dimensional robot main path (ride path) showing individual points along the path and safety markers with points associated with safety markers and each safety marker associated with a safety path.

FIG. 3B is a view similar to FIG. 3A showing positions 34 that define the ride path and the inserted safety markers 40 provided in the path table 2. As the path table manager 13 executes the path table 2 the path manager 13 will keep track of the currently active safety marker 40. If for example the robot R comes to a stop at position 34', the robot controller 6 will have safety marker 2 (SM2) currently active. If the safety path is then initiated, the robot moves through safe positron 2, 1 then to safe position 2, 2 and finally to safe position. A common unload position may be provided for the various safety paths 36 or several safe unload positions may be provided. The various paths 36 may share one or several safe positions along their paths. Further, different safety levels may be defined by the safety positions along the paths.

Figure 2:
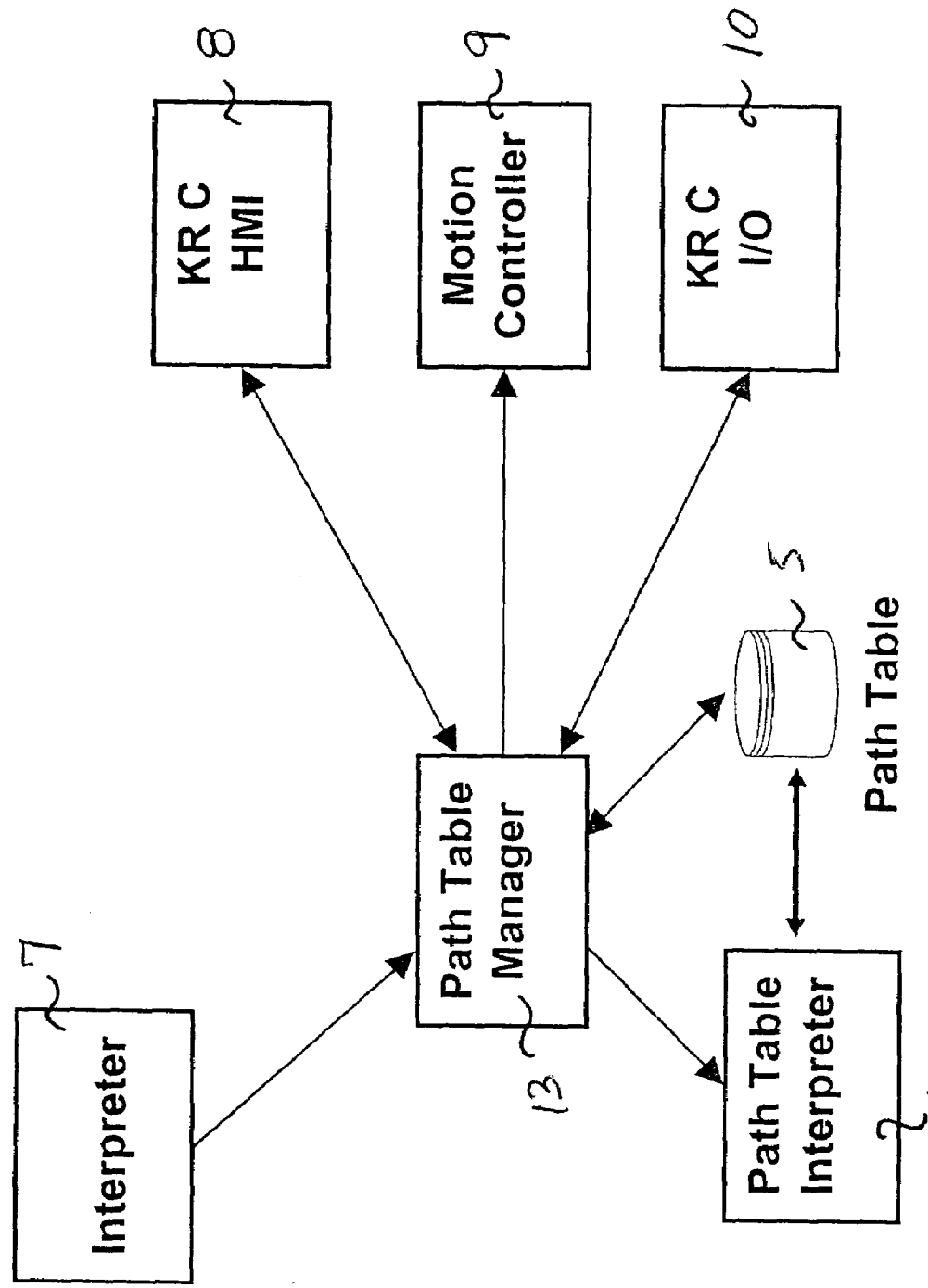
FIG. 2 is a block diagram showing aspects of the robot control using the path table to control motion.
Figure 4:
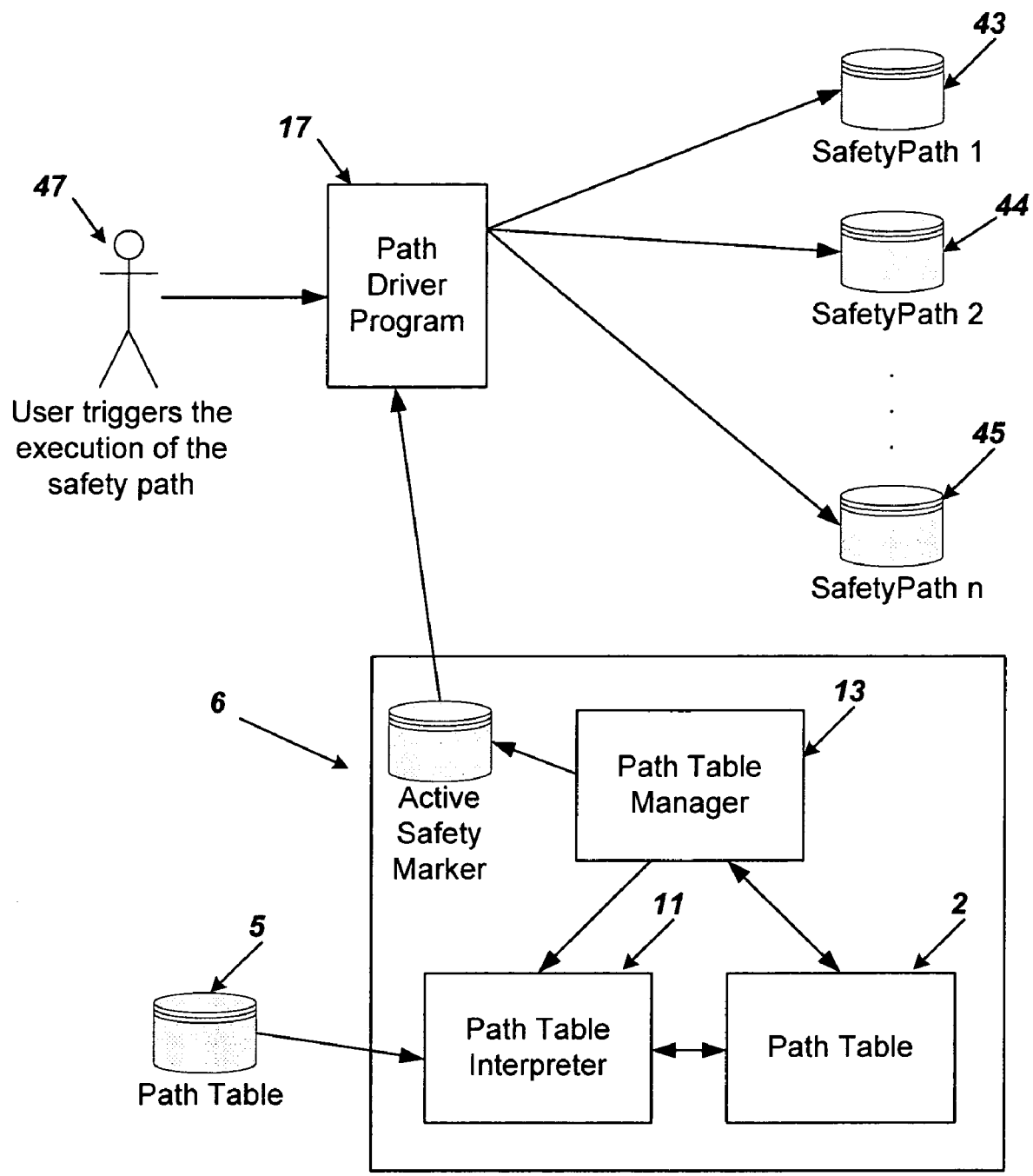
FIG. 4 is a high-level system architecture diagram showing the safety path architecture used within the controller for robot path control; this is an example of how the safety patch concept is integrated into a robot control which uses the path table to move the robot.

The path table system described with reference to FIGS. 1 and 2, e.g., associating positions of the axes A1-A6 with a position of the turntable can be used as a basic control system with the addition of the safety path features described above. FIG. 4 shows a high-level safety path architecture working with a controller 6 as described above. The path table manager 13 works with the path table 2 so as to maintain the currently active safety markers 40. The path table interpreter 11 is responsible for parsing the path table file stored in memory 5 so as to identify active safety markers 40. FIG. 4 shows the controller 6 with the path table 2 depicted as being the actual path data in the active memory of the controller 6 with this including safety marker data. The path driver program 17 runs the ride path based on the received data from the controller 6. Safety paths 43, 44 and 45 are shown representing a first safety path, a second safety path and an nth safety path respectively. A user 48 is schematically shown, depicting the case in which the safety path is executed via a code or the like which is manually triggered by the user 48.

In the disclosed embodiment some constraints (technical and system) may be imposed. There may be limitations on the total number of safety positions (due to memory constraints. The safety path preferably cannot be executed while the robot is actively following the ride path as defined by the turn table position (path table 2). The robot R must first come to a complete stop and the main path defined by the path table 2 should be deactivated. This is a constraint because the robot safety path relative to world is preferably not explicitly defined while the turn table is moving.

Figure 5:
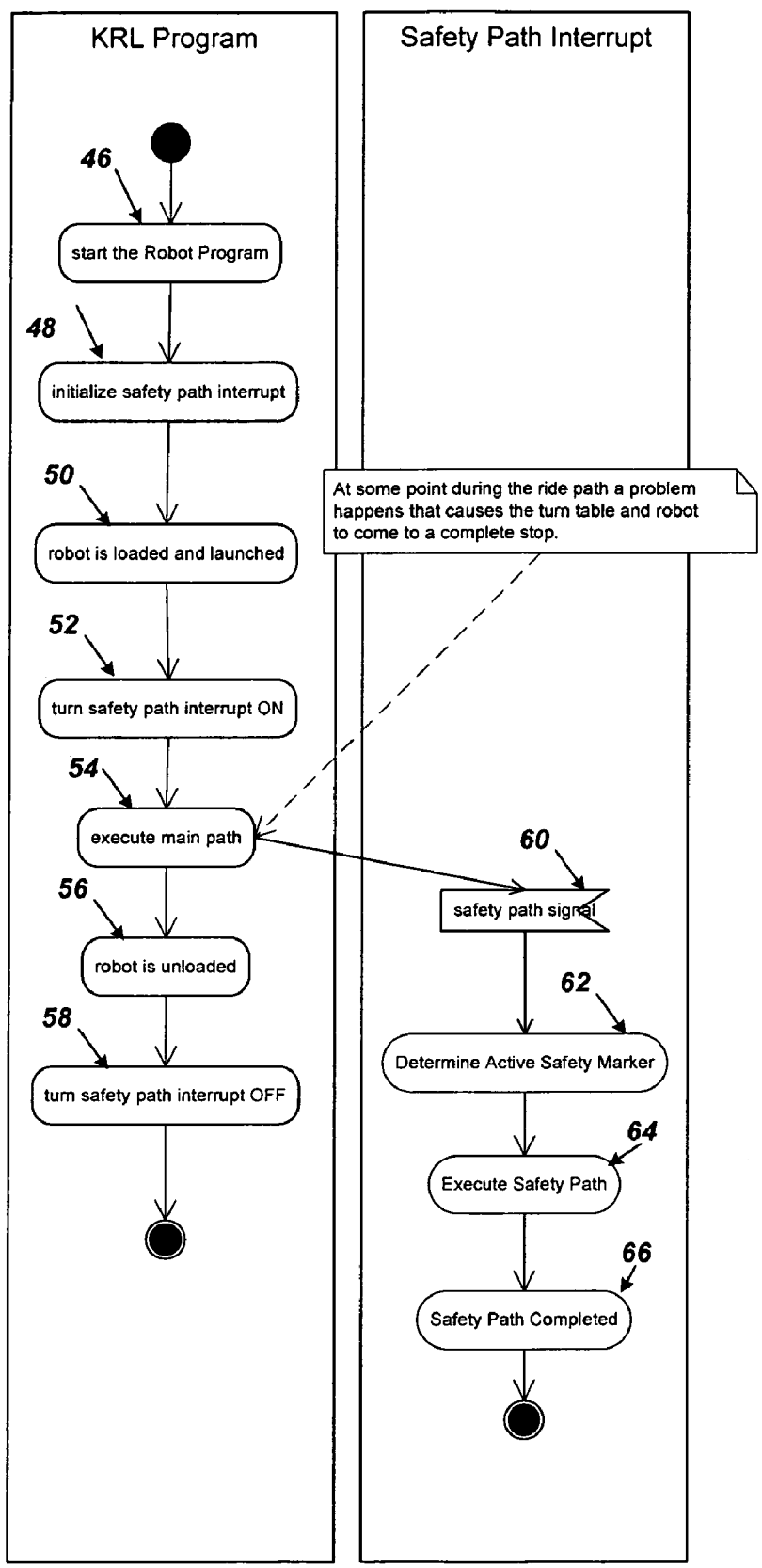
FIG. 5 is a block diagram showing a sequence of events using a safety path interrupt according to the system in process of the invention.

The safety path system described with reference to FIGS. 3A and B may be implemented based on an interrupt which executes the motion of the safety path. For this implementation an interrupt is defined to monitor for a safety path request. When the robot comes to a stop on the ride path and the interrupt is fired (activated) the interrupt program will determine which safety marker is active and execute the respective safety path. The interrupt cannot set motion schedules but can execute pure motion (not using the motion folds). FIG. 5 shows the sequence of events that the robot program will execute when running the ride program and subsequently the safety interrupt.

As shown in FIG. 5 to robot program is started at 46. With the start of the robot program the safety path interrupt is initialized at 48. The robot is loaded and launched as indicated at 50 with this including the turning on of the safety interrupt as indicated at 52. The robot R begins to execute the main path as shown at 54 whereby the path driver 17 moves the robot through the main path 32 based on the path table 2. Normally, this proceeds with the robot being moved to a not unloaded position as shown at 56. Subsequently, the safety path interrupt is turned off as shown at 58. However, during the course of motion along main path 32, a safety path signal may be activated as shown at 60. This occurs at some point during the robot path 32 were not a problem happens that causes the robot to come to complete stop or an emergency stop is initiated. The system then determines the active safety marker 40 as shown at 62. The system then executes the safety path as shown at 64 wherein this is completed as shown at 66.

FIG. 5 shows the various sequential steps with reference to be path program (path driver program), and the safety path interrupt. If the robot R is to run the ride path again it will be required to be executed from the start. This will guarantee that the robot R will not execute the ride path 32 until it is dispatched to the start.

Various techniques may be used as top the setting up of the system including how the positions taught to the robot R and the format for storage as well as how the user specifies the type of motion to execute (i.e. LIN move, PTP move). The system preferably provides features allowing the interrupt to be restricted so that it is only executed when the robot has come to a complete stop. The speed be set for the actual motion must be considered and the insertion of the safety markers 40 can be only with respect to the actual table path 2 or they may be set in the simulation software, or inserted while validating the path on a robot.

While specific embodiments of the invention have been shown and described in detail to illustrate the application of the principles of the invention, it will be understood that the invention may be embodied otherwise without departing from such principles.

R Robot
2 path table 2
6 robot control
5 external memory
7 position interpreter
9 control output
10 inputs and outputs
11 path table interpreter 11
13 path table manager
15 path monitor
17 path driver
17*a* signal 17*a*.
17*b* robot position signal 17*b*
19 security path monitor
30 actual axis position
32 main path (ride path)
33 safety level 1 point
34 various points along the main path
34' current stop at position
35 safety level 2 point
36 safety path
38 safe unload point 38
40 safety markers
43 1$^{st}$ safety path
44 2$^{nd}$ safety path
45 nth safety path
46 start
47 user
48 safety path interrupt is initialized
50 robot is loaded and launched
52 turning on of the safety interrupt
54 execute the ride path (main path)
56 move robot to a not unloaded position
58 safety path interrupt is turned off
60 safety path signal activated 62 determine the active safety marker
64 execute the safety path
66 complete safety path

What is claimed is:

1. A process for controlling a robot path of a robot during emergency evacuation from the main path, the process comprising:
providing a main path for movement of the robot, said main path having evacuation points;
moving the robot along said main path;
providing at least one final safe position and at least one safety level point, said at least one safety level point being located between one or more said evacuation points and said at least one final safe position, said at least one safety level point being associated with a plurality of said evacuation points, said at least one final safe position, said at least one safety level point and one of said evacuation points defining one or more safe evacuation paths;
moving the robot along one of said safe evacuation paths when an emergency situation exists such that the robot moves from said one of said evacuation points through said at least one safety level point to said at least one final safe position.

2. A process for controlling a robot path of a robot according to claim 1, wherein a programmer teaches the robot or sets points to form the main path with safe evacuation path considerations in mind such that along any point on the main path the robot can be safely moved to a safety point or safe position.

3. A process for controlling a robot path of a robot according to claim 1, wherein the safe evacuation path includes a safety level two point, said at least one safety level point being a safety level one point, said safety level one point and said safety level two point being located between said one or more evacuation points and said final safe position.

4. A process for controlling a robot path of a robot according to claim 1, wherein the robot has a primary motion aspect and plural axes each having a motion aspect and the main path is defined based on positions of the axes assigned to the position of the primary motion via a path table.

5. A process for controlling a robot path of a robot according to claim 4, wherein the robot has a turntable and the primary motion is the motion of the turntable with a unique position provided for each position of the turn table based on a resolution of the turn table encoder monitoring the position of the turntable.

6. A process for controlling a robot path of a multiaxial robot having a tool center point, the process comprising:
moving the tool center point along a travel path defined by a plurality of location points;
defining a first safety robot path, said first safety robot path comprising a first safety level robot position and a first final safety robot position, said first safety level robot position being associated with a first plurality of said location points of said travel path;
defining a second safety robot path, said second safety robot path comprising a second safety level robot position and a second final safety robot position, said first safety level robot position being associated with a second plurality of said location points of said travel path;
upon a need to remove the robot from the travel path moving the robot along one of said first safety robot path and said second safety robot path based on a current location point of the robot along the travel path such that the robot moves from said current location point to one of said first final safety robot position and said second final safety robot position.

7. A process according to claim 6, wherein the travel path is defined with safety markers associated with some of the location points, wherein the safety paths are associated with the safety markers and one of the safety paths is selected for the step of moving the robot along one of the safety paths based on the proximity of the current location to the safety markers.

8. A process according to claim 7, wherein the robot is moved along the travel path based on a motion aspect of the robot being designated as a primary motion with a synchronizing of motions of axes of the robot with the primary motion wherein positions of the axes are assigned to the position of the primary motion via a path table for defining the travel path.

9. A process according to claim 8, wherein the motions of axes of the robot include the secondary axes motion as the robot moves along the travel path and the synchronization of the motion of the secondary axes with the primary motion includes using position encoders provided at the path of a turntable as a primary motion.

10. A process according to claim 6, wherein the need to remove the robot from the travel path includes one of a stopping the turntable or a forced emergency stopping of the turntable before moving the robot along one of the safety paths based on the current location point of the robot along the travel path.

11. A multiaxial robot path control system, comprising:
a system memory means for storing data;
a multiaxial robot with turntable;
a control unit for moving a tool center point along a travel path defined by location points saved in said memory means; and
a plurality of safety paths saved in said memory means, each safety path comprising at least one safety level point and at least one final safe position, said at least one safety level point being associated with a plurality of location points of the travel path, said at least one safety level point being arranged between said at least one final safe position and said plurality of location points of the travel path, wherein upon a need to remove the robot from the travel path, the control unit moves the robot along one of the safety paths based on a current location point of the robot along the travel path such that the robot moves to one of said final safe positions.

12. A system according to claim 11, wherein the travel path is defined with safety markers associated with some of the location points, wherein the safety paths are associated with the safety markers and one of the safety paths is selected for moving the robot along one of the safety paths based on the proximity of the current location point to the safety markers.

13. A system according to claim 12, wherein the robot is moved along the travel path based on a motion aspect of the robot being designated as a primary motion with a synchronizing of motions of axes of the robot with the primary motion wherein positions of the axes are assigned to the position of the primary motion via a path table for defining the travel path.

14. A system according to claim 13, wherein the motions of axes of the robot include secondary axes motion as the robot moves along the travel path and the synchronization of the motion of the secondary axes with the primary motion includes using position encoders provided at the path of a turntable as a primary motion.

15. A system according to claim 14, wherein the need to remove the robot from the travel path includes one of a stopping the turntable or a forced emergency stopping of the turntable before moving the robot along one of the safety paths based on the current location point of the robot along the travel path.

* * * * *